United States Patent Office 3,367,922
Patented Feb. 6, 1968

3,367,922
PROCESS FOR COPOLYMERIZING ETHYLENE
AND HIGHER 1-MONOOLEFINS
Richard J. Sonnenfeld and Ollie G. Buck, Bartlesville, Okla., assignors to Phillips Petroleum Company, a corporation of Delaware
No Drawing. Filed Sept. 12, 1963, Ser. No. 308,338
7 Claims. (Cl. 260—80.78)

This invention relates to a process for the copolymerization of ethylene and higher 1-monoolefins. In another aspect, it relates to a continuous process for copolymerizing ethylene, at least one higher 1-monoolefin, and a monomer which imparts unsaturation to the resulting polymer. In another aspect, it relates to a novel charging procedure for use in the copolymerization of ethylene and higher 1-monoolefins.

Many 1-monoolefins, such as ethylene and propylene, can be copolymerized to form copolymers ranging from low molecular weight oils to high molecular weight solids. Recently, commercial interest has developed in the preparation of elastomeric copolymers of ethylene and propylene, these copolymers having a high molecular weight and a high degree of resistance to weathering, sunlight and ozone.

In carrying out the copolymerization of ethylene and higher 1-monoolefins according to the prior art, the usual procedure is to charge the monomers to the polymerization reactor containing a premixed, two-component, activated coordination catalyst, or to charge the premixed catalyst or the separate components thereof to the reactor filled with the monomers. Though the polymerization can be carried out satisfactorily in this manner, there are certain disadvantages attendant such charging procedures. For example, if the catalyst is prepared by premixing the catalyst components and the resulting premixed catalyst is not immediately employed, oftentimes a precipitate will form and settle, causing obstruction of lines, nozzles, etc. Also, a premixed catalyst often declines or changes in activity upon aging. Where the catalyst is prepared in situ by separately charging the components to a reactor filled or subsequently filled with monomers, is often difficult to maintain a constant desired ratio of catalyst components and a desired catalyst level. Such charging procedures, consequently, make it difficult to control the reaction conditions and the uniformity of the polymer product.

Accordingly, an object of this invention is to provide an improved process for copolymerizing ethylene and higher 1-monoolefins. Another object is to provide an improved continuous process for copolymerizing such monomers and a monomer which imparts unsaturation to the resulting polymer. Another object is to provide in such a polymerization process a novel charging procedure by which close control can be exercised over the ratio of catalyst components, catalyst level, catalyst activity, reaction conditions, and uniformity of polymer product. Further objects and advantages of this invention will become apparent to those skilled in the art from the following description and appended claims.

Briefly, the continuous process of copolymerizing ethylene and at least one other 1-monoolefin, such as propylene, in a solvent with a polymerization coordination catalyst comprising a reducible component, such as vanadium tetrachloride or vanadium oxytrichloride, and a reducing component, such as ethylaluminum sesquichloride, is improved by separately and substantially simultaneously charging to the polymerization reaction zone, a first stream comprising ethylene, solvent, and one of said catalyst components, and a second stream comprising said higher 1-monoolefins, solvent, and the other of said catalyst components. Where the monomeric material also comprises a termonomer, such as dicyclopentadiene, such termonomer is charged is that stream containing the reducing catalyst component, which stream preferably contains said higher 1-monoolefin.

As an illustration of the charging procedure of this invention, two reservoir or makeup tanks can be provided, each having supply conduits with flow control valves and the like and flow measuring means such as rotometers for the stream components. The contents from the two makeup tanks are passed by separate conduits, provided with pumps or rotometers and flow control valves, to the polymerization reactor, initially filled to the desired level with solvent, where the catalyst is formed or generated in situ in the presence of the monomers at the desired ratios and catalyst levels desired during polymerization. The makeup tanks can be so sized that they are pumped out or emptied at the same time and these makeup tanks can be provided with suitable agitators or the like for blending the stream components. The supply of the stream components to the makeup tanks can be varied as desired, for example during polymerization, to regulate the concentration of the individual stream components, catalyst ratios, etc. The flow rates of the two streams can be regulated to maintain the desired monomer ratios in the reactor as well as that of the catalyst components. The reactor is maintained at a constant liquid volume by regulating the flow of charge streams and the withdrawal of the effluent therefrom, and it can be provided with agitators or the like, cooling coils or a cooling jacket, and the usual appurtenances common to polymerization reactors. The polymerization effluent can be passed through a pressure release valve and thence to a flash member for removal of vaporized, unreacted monomers, and the flashed effluent can thereafter be treated with the usual additives, such as antioxidant, and the polymer recovered from the effluent, for example by precipitation with an antisolvent, such as isopropyl alcohol.

Since the catalyst is continuously and freshly generated in situ as it is used in polymerization, there is no need to preliminarily filter any precipitate which would otherwise form on standing and there is no need to compensate for any decline or change in catalyst activity due to aging. The improved charging procedure of this invention permits close control over reaction conditions and results in the production of polymer product with desired uniform properties.

The 1-monoolefins which are copolymerized with ethylene or with ethylene and termonomers such as dicyclopentadiene, according to this invention, can be represented by the general formula $CH_2=CHR$, where R is an alkyl radical having 1 to 6 carbon atoms. Representative 1-monoolefins coming within the scope of this general formula and useful in this invention include propylene, 1-butene, 1-pentene, 1-hexene, 1-octene, 3-methyl-1-butene, 3-methyl-1-pentene, 3-methyl-1-hexene, 4-ethyl-1-hexene, 4,4-dimethyl-1-pentene, 3,3-dimethyl-1-butene, 5-methyl-1-hexene, 4-methyl-1-heptene, 5-methyl-1-heptene, 4,4-dimethyl-1-hexene, 6-methyl-1-heptene, 3,4,4-trimethyl-1-pentene, and the like, including mixtures of two, three or more thereof.

The termonomers which can be copolymerized with ethylene and any one of the above-mentioned 1-monoolefins, according to this invention, include any of those known in the art, particularly those which impart ethylenic unsaturation to the polymer and enable the same to be vulcanized with sulfur. Representative termonomers are dicyclopentadiene (3a,4,7,7a-tetrahydro-4,7-methanoindene), acyclic non-conjugated dienes such as 1,4-pentadiene, 1,5-hexadiene, 2-methyl-1,5-hexadiene, 3,3-dimethyl-1,5-hexadiene, 1,7-octadiene, 1,9-decadiene, 6-methyl-1,5-heptadiene, 11-ethyl-1,11-triadecadiene, and the like; acetylenes such as acetylene, vinylacetylene, isopropyl-acetylene, and the like; and norbornenes such as 5-methylene-2-norbornene, and the like.

The relative percentages of the polymers prepared by the improved process of this invention which are attributable to each of the monomers employed can vary widely. Generally, the ethylene and higher 1-monoolefin comonomers will each make up from 25 to 75 weight percent of the polymer, and where a termonomer, such as dicyclopentadiene, is employed, it will generally make up from 0.5 to 20 weight percent of the polymer. Of course, the nature of the polymer, that is its molecular weight, inherent viscosity, tensile strength, etc., will be dependent upon the monomeric materials charged and their relative ratios and the reaction conditions, and those skilled in the art of polymerization will be readily able by means of simple routine tests to determine what conditions are optimum for any particular polymer product desired.

Any of the polymerization coordination catalysts known in the prior art can be employed in the polymerization process of this invention, such catalysts comprising (1) at least one compound of a reducible polyvalent transition metal of Groups IVB, VB, VIB, VIIB, VIII of the Periodic Table (e.g., titanium, vanadium, chromium, manganese, iron, cobalt, and nickel), said reducible compound being a halide, oxyhalide, or acetylacetonate, acetate, and (2) at least one reducing compound of a metal of Groups I, II, IIIA, IVA, and VA of the Periodic Table (e.g., lithium, sodium, potassium, rubidium, cesium, beryllium, magnesium, calcium, strontium, barium, copper, zinc, cadmium, mercury, aluminum, tin, and antimony), which is preferably above hydrogen in the electromotive series, said reducing compound being an organometal compound, a metal hydride, an organometal hydride or an organometal halogen compound. (The Periodic Table referred to herein and in the claims is shown on page B-2 of the Handbook of Chemistry & Physics, 45th edition, published by Chemical Rubber Publishing Co., Cleveland, Ohio.) Preferably, the metal of the reducible compound is vanadium, titanium or chromium, with vanadium trichloride, vanadium tetrachloride, vanadium oxytrichloride, vanadium oxydichloride, vanadium acetylacetonate, vanadyl acetylacetonate, titanium tetrachloride, tetrabutyl titanate, tertaisopropyl titanate, chromic chloride, chromium acetylacetonate, and chromyl acetylacetone being examples of preferred reducible components of the coordination catalyst. Preferably, the reducing compound has the general formula $R_nMX_m$ where R is a saturated aliphatic, saturated cycloaliphatic, or aromatic hydrocarbon radical having from 1 to 20 carbon atoms, M is a metal selected from the group consisting of lithium, sodium, potassium, magnesium, calcium, zinc, mercury, aluminum, and tin, X is a halogen selected from the group consisting of chlorine, bromine, and iodine, $n$ is a number from 1 to 4, $m$ is a number from 0 to 2, and $n+m$ is equal to the valence of metal M. The mole ratio of the reducing compound to the reducible compound in the catalyst system can vary widely, and generally this ratio will be in the range of 1/1 to 20/1. The total catalyst level in the reaction system can also vary widely, and generally will be 0.001 to 10 percent by weight of the total monomers, or as expressed in terms of the amount of reducible compound, the catalyst level can be in the range of 0.25 to 40 millimoles (mmoles.) per 100 grams of the total monoolefin charged to the reaction system.

Representative reducible transition metal compounds which can be used in making up the coordination catalysts used in preparing the polymers of this invention include: titanium tetrachloride, titanium tetrabromide, titanium oxydichloride, tetraisopropyl titanate, titanium trichloride, tetra-n-butyl titanate, tetra-2-ethylbutyl titanate, vanadium trichloride, vanadium tetrachloride, vanadium oxytrichloride, vanadium acetylacetonate, vanadyl acetylacetonate, tetra-n-butyl vanadate, tetraethyl vanadate, trimethyl orthovanadate, vanadium oxydichloride, vanadium dichloride, 2-ethylhexyl vanadate, vanadium dibromide, vanadium pentoxide, chromyl chloride, chromium acetylacetonate, chromyl acetylacetonate, chromium chloride, cobaltous chloride, manganese bromide, cuprous chloride, ferric bromide, molybdenum chloride, nickel chloride, and the like, including mixtures thereof.

Representative reducing compounds which can be commingled with any one of the above-named transition metal compounds to prepare the coordination catalyst used in this invention include: ethylaluminum sesquichloride, ethylaluminum sesquiiodide, n-butylaluminum sesquibromide, isopropylaluminum sesquichloride, n-hexylaluminum sesquichloride, n-decylaluminum sesquiiodide, trihexylaluminum, triethylaluminum, diethylaluminum chloride, ethylaluminum dichloride, diisobutylaluminum butoxide, triisobutylaluminum, aluminum hydride, isobutylaluminum dichloride, isobutylaluminum dibutoxide, n-butylaluminum dichloride, n-butyllithium, sodium naphthalene, diisobutylzinc, lithium aluminum tetra-n-decyl, lithium aluminum tetra-n-octyl, amylpotassium, tetraphenyltin, diethyltin diiodide, n-butylmagnesium bromide, diphenylcalcium, di-tert-butylzinc, diethylmercury, and the like, including mixtures thereof.

Representative of the coordination catalysts which can be used in this invention are those obtained upon commingling vanadium tetrachloride and ethylaluminum sesquichloride, vanadium trichloride and ethylaluminum sesquibromide, vanadium oxytrichloride, and n-butylaluminum sesquibromide, vanadium oxydichloride and isopropylaluminum sesquichloride, vanadium acetylacetonate and n-hexylaluminum sesquichloride, vanadium oxydichloride and diisobutylaluminum butoxide, vanadium oxytrichloride and triisobutylaluminum, vanadium oxytrichloride and aluminum hydride, vanadium dichloride and triisobutylaluminum, vanadium trichloride and isobutylaluminum dichloride, vanadium tetrachloride and isobutylaluminum dibutoxide, vanadium tetrachloride and triisobutylaluminum, vanadium tetrachloride and aluminum hydride, 2-ethylhexyl vanadate and triisobutylaluminum, titanyl dichloride and isobutylaluminum dichloride, titanium tetrachloride and isobutylaluminum dichloride, titanium tetrachloride and lithium aluminum didodecyldichloride, titanium tetrachloride and n-decylaluminum sesquiiodide, titanium tetrachloride and sodium naphthalene, tetraisopropyl titanate and triisobutylaluminum, tetraisopropyl titanate and sodium naphthalene, cobaltous chloride and triisobutylaluminum, cobalt bromide or chloride and triisobutylaluminum, manganese bromide and triisobutylaluminum, manganese bromide and diisobutylzinc, chromium chloride and triisobutylaluminum, chromium acetylacetonate and n-heptylaluminum sesquichloride, cuprous chloride and triisobutylaluminum, ferric bromide and triisobutylaluminum, molybdenum chloride and triisobutylaluminum, nickel chloride and triisobutylaluminum, vanadium oxytrichloride and diethylaluminum chloride, vanadium tetrachloride and ethylaluminum dichloride, vanadium oxydiacetylacetonate and triethylaluminum, trimethyl orthovanadate and trihexylaluminum, vanadium tetrachloride and trihexylaluminum, vanadium oxytrichloride and butyllithium, vanadium triacetylacetonate and diethylaluminum chloride, titanium tetrachloride and trihexylaluminum, vanadium trichloride and trihexylaluminum, titanium trichloride and trihexylaluminum, titanium dichloride and trihexylaluminum, vanadium trichloride and n-butyllithium, vanadium tetrachloride and amylpotassium, vanadium oxytrichloride and sodium naphthalene, vanadium oxydichloride and diethylmagnesium, vanadium acetylacetonate and butylmagnesium bromide, vanadyl acetylacetonate and diphenylcalcium, chromic chloride and di-tert-butylzinc, chromium acetylacetonate and diethylmercury, chromyl acetylacetonate and tetraphenyltin, titanium tetrachloride and diethyltin diiodide, tetra-n-butyl titanate and diethylmagnesium, and the like.

The polymerization reaction of this invention is carried out in the liquid phase system using a solvent, or a mixture of solvents, in which the catalyst and polymer product are soluble. As such, the system can be described as a solution polymerization system. The solvent is charged to the reactor in each of the two feed streams, and the concentration of the monomeric materials in the feed streams can vary and will be dependent upon the particular polymer product desired. Usually, the feed stream containing ethylene will contain from 1 to 15 weight percent of the ethylene in the solvent, and the feed stream containing the higher 1-monoolefin will contain the latter in a concentration of about 1 to 30 weight percent in the solvent. Where a termonomer is used, it will be present generally in the feed stream in the amount of about 0.02 to 10 weight percent in the solvent. Solvents which can be employed include any of those known in the prior art, and these solvents will usually be a hydrocarbon or halogenated hydrocarbon, such as propane, butane, hexane, benzene, toluene, xylene, tetrachloroethylene, cyclohexane, methylcyclohexane, chlorobenzene, o-dichlorobenzene, dichloromethane, 1,1,2,2-tetrachloroethane, and the like. The polymer, as mentioned above, will be soluble in the solvent and usually will be present in a concentration of 1 to 15 weight percent.

The polymerization reaction of this invention is carried out in the absence of those materials which have a deleterious effect on the catalyst activity, such as oxygen, carbon dioxide, and water. The polymerization conditions can vary widely, but generally the polymerization temperature will be in the range of −80 to 150° C. The reaction pressure, maintained by an inert atmosphere such as nitrogen, will be that sufficient to maintain the reaction mixture in the liquid phase and can be up to 500 or more atmospheres.

Following polymerization, the polymer product can be conventionally recovered from the effluent by coagulation with a non-solvent such as an alcohol like isopropyl alcohol or n-butyl alcohol, acetone, or the polymer can be recovered by stripping the solvent with heat or steam. An antioxidant can be incorporated in the polymer during the recovery procedure, such as phenyl-beta-naphthylamine, di-tert-butylhydroquinone, triphenylphosphite, heptylated diphenylamine, 2,2′-methylene-bis(4-methyl-6-tert-butylphenol), and 2,2,4-trimethyl-6-phenyl-1,2-dihydroquinoline.

Vulcanization or curing of the polymers prepared by this invention can be carried out with conventional vulcanization procedures. Where sulfur is employed in the vulcanization of the polymers, the amount of sulfur used will generally be about 0.1 to 5 parts by weight per 100 parts of polymer (phr) and generally about 0.5 to 3 phr. The vulcanization can be effected, for example, at temperatures of 250 to 400° F. for 5 to 120 minutes. Peroxides, for example 0.1 to 10 phr, can be used for vulcanization, representative peroxides being bis(alpha, alpha-dimethylbenzyl) peroxide, diisopropyl peroxide, di-tert-butyl peroxide, dibenzoyl peroxide, alpha, alpha- dimethylbenzyl hydroperoxide, tert-butyl perbenzoate, etc. Vulcanization accelerators, accelerator activators, reinforcing agents, extenders, plasticizers, antioxidants and fillers, like those agents used in compounding natural and synthetic rubber, can also be employed. Fillers and reinforcing agents such as carbon black, clay, calcium silicate, talc, silica, whiting, and titanium dioxide, and plasticizers such as naphthenic and paraffinic oils, can be used in compounding the polymers of this invention. Such polymers will have molecular weights in the range of about 5000 to 1,000,000, and can be used in fabricating such rubber goods and plastic products as coatings for electrical cables, window-seals, garden hose, soles and heels, belts, coated fabrics, tires films coatings, containers (bottles), pipes, fibers, etc.

The objects and advantages of this invention are illustrated in the following examples, but it should be understood that the various materials used in these examples, the conditions of operation, and other details, should not be construed to unduly limit this invention.

*Example 1*

In this example, ethylene/propylene/dicyclopentadiene rubbery terpolymers were prepared by four continuous polymerization runs according to this invention. In each run, a 1-liter autoclave was used as the polymerization reactor, and it was charged simultaneously with two separate feed streams from two makeup tanks at rates such that the completion of addition of materials from both tanks occurred at the same time. At the beginning of each run, 500 ml. of toluene was charged to the reactor, which had previously been filled with nitrogen. After charging this solvent, the reactor was pressured with nitrogen to 180 p.s.i.g. Introduction of the composite streams was started at the same time and continued until the makeup tanks were emptied. Throughout each run, 500 ml. of material was maintained in the reactor by regulating the withdrawal of effluent therefrom. In each run, the reaction mixture was allowed to remain in the reactor 5 minutes after pumping of the streams to the reactor was stopped, and the "polymerization time" for a run is that time the reaction mixture remained in the reactor. Following polymerization, the reactor effluent was flashed to remove unreacted ethylene and propylene. Two weight percent of 2,2′-methylene - bis(4-methyl-6-tert-butylphenol) antioxidant was added to the effluent, the rubbery polymer was coagulated with isopropyl alcohol, separated and dried, and the properties of the polymer products were determined. The composition of the charge streams, reaction conditions, and polymer properties are set forth in Table I.

TABLE I

| | Runs | | | | | | | |
|---|---|---|---|---|---|---|---|---|
| | 1 | | 2 | | 3 | | 4 | |
| | Stream 1 | Stream 2 | Stream 1 | Stream 2 | Stream 1 | Stream 2 | Stream 1 | Stream 2 |
| Charge stream components: | | | | | | | | |
| Toluene, ml | 1,600 | 1,600 | 1,600 | 1,600 | 1,600 | 1,600 | 1,600 | 1,600 |
| Ethylene, gm | 80 | 0 | 80 | 0 | 80 | 0 | 80 | 0 |
| Propylene, gm | 0 | 200 | 0 | 160 | 0 | 200 | 0 | 200 |
| Dicyclopentadiene, gm | 0 | 13.2 | 0 | 10.6 | 0 | 15.8 | 0 | 15.8 |
| Vanadium tetrachloride (VCl4), mmoles | 4 | 0 | 2.6 | 0 | 1.6 | 0 | 1.6 | 0 |
| Ethylaluminum sesquichloride (EASC), mmoles | 0 | 20 | 0 | 3.2 | 0 | 2.0 | 0 | 8.0 |
| Charge stream pump rate, ml./min | 14.0 | 15.8 | 16.5 | 18.0 | 36.0 | 40.7 | 36.0 | 41.0 |
| VCl4/EASC mole ratio | 1/5 | | 1/1.25 | | 1/1.21 | | 1/5 | |
| Flow rate through reactor, vol. total feed/liq. vol. reactor/hr | 3.6 | | 4.1 | | 9.2 | | 9.3 | |
| Polymerization temp., °F | 80 | | 80 | | 80 | | 80 | |
| Polymerization time, min | 130 | | 110 | | 53 | | 53 | |
| Conversion (based on ethylene and propylene), Wt. percent | 39.6 | | 43.8 | | 37.4 | | 34.6 | |
| Polymer properties: | | | | | | | | |
| Wt. percent of propylene units in polymer | 57 | | 41 | | 41 | | 40 | |
| Total unsaturation, mmoles. ICl/gm. polymer | 0.36 | | 0.34 | | 0.46 | | 0.48 | |
| Inherent viscosity | 0.58 | | 1.39 | | 1.03 | | 1.34 | |
| Toluene insolubles, wt. percent | 11 | | 0 | | 0 | | Trace | |
| Mooney viscosity, ML-4 at 212° F | | | 61.5 | | 22 | | 114 | |

The polymer products from runs 2, 3 and 4 were compounded and cured 30 minutes at 320° F. The compounding recipe employed in all the runs is set forth in Table II.

TABLE II

| | Parts by wt. |
|---|---|
| Polymer blend | 100 |
| High abrasion furnace black | 50 |
| Zinc oxide | 5 |
| Stearic acid | 1 |
| Circosol 2XH[a] | 30 |
| Sulfur | 1.5 |
| Captax[b] | 0.5 |
| Monex[c] | 1.5 |

[a] Petroleum hydrocarbon softener, containing hydrocarbons of high molecular weight, in the form of a heavy, viscous, transparent, pale green, odorless liquid of low volatility; specific gravity, 0.940; Saybolt Universal viscosity at 100° F., about 2000 seconds.
[b] 2-mercaptobenzothiazole.
[c] Tetramethylthiuram monosulfide.

The Mooney viscosity of the compounded polymers and the properties of the cured polymer products are set forth in Table III.

TABLE III

| | Polymer | | |
|---|---|---|---|
| | 2 | 3 | 4 |
| Mooney viscosity of compound polymer (ML-4 at 212° F.) | 69.0 | 21.8 | 84.0 |
| 300% Modulus, p.s.i. | 1,500 | 1,440 | 1,760 |
| Tensile strength, p.s.i. | 3,490 | 2,810 | 2,740 |
| Elongation, percent | 480 | 480 | 390 |
| ΔT., ° F. | 50.7 | 60.6 | 44.6 |
| Resilience, percent | 71.5 | 66.2 | 72.3 |
| Shore A hardness | 66.0 | 69.0 | 70.0 |
| Gehman Freeze Point, ° C. | | | −153 |

*Example II*

In this example, an ethylene/propylene/vinylacetylene terpolymer was prepared according to this invention, using the procedure of Example I. Stream compositions, reaction conditions, and the properties of the recovered terpolymer are set forth in Table IV.

TABLE IV

| | Stream 1 | Stream 2 |
|---|---|---|
| Charge stream components: | | |
| Toluene, ml | 1,600 | 1,600 |
| Ethylene, gm | 80 | 0 |
| Propylene, gm | 0 | 200 |
| Vinylacetylene, gm | 0 | 8.3 |
| Vanadium tetrachloride, mmoles | 4 | 0 |
| Ethylaluminum sesquichloride, mmoles | 0 | 10 |
| Charge stream pump rate, ml./min | 37 | 42 |
| VCl$_4$/EASC mole ratio | 2.5/1 | |
| Flow rate through reactor, vol. total feed/liq. vol. reactor/hr | 9.4 | |
| Polymerization temp., ° F | 80 | |
| Polymerization time, min | 52 | |
| Conversion (based on ethylene and propylene), wt. percent | 20.8 | |
| Polymer properties: | | |
| Wt. percent of propylene units in polymer | 33 | |
| Total unsaturation, mmoles. ICl/gm. polymer | 0.33 | |
| Inherent viscosity | 1.04 | |

The ethylene/propylene/vinylacetylene terpolymer was then cured using the compounding recipe of Table II, except that only 20 parts by weight of Circosol 2XH was used. The compounded polymer was then cured at 320° F. and the properties of the cured polymer at 30 min. and 45 min. cure times are set forth in Table V.

TABLE V

| | Cure time, min. | |
|---|---|---|
| | 30 | 45 |
| 300% Modulus, p.s.i. | 1,350 | 1,580 |
| Tensile, p.s.i. | 2,505 | 2,850 |
| Elongation, percent | 535 | 505 |
| Resilience, percent | 62.5 | 61.8 |
| Shore A hardness | 86.5 | 88 |

In the foregoing examples, the procedure used to determine total unsaturation by iodine chloride titration was as follows: A 0.5-gram sample of polymer was dissolved in a 75/25 volume mixture of carbon disulfide and chloroform, a chloroform solution of iodine chloride of known concentration (approximately 0.09–0.10 molar) was added, the mixture was placed in a 25° C. bath for one hour to allow time for reaction, and the excess of iodine chloride was titrated with 0.05 N sodium thiosulfate. The millimoles of iodine chloride that reacted with one gram of sample was then calculated. A blank was run using only solvent and iodine chloride and appropriate correction was made when calculating unsaturation.

In the examples, an infrared procedure was used to determine the wt. percent propylene. A carbon tetrachloride solution of the polymer containing one gram of polymer per 100 milliliters solvent was used. The solution was placed in a 1500-micron cell and scanned for a peak at the 7.25 micron band using a commercial infrared spectrophotometer. The number of methyl groups (N) was obtained from the formula:

$$N = \frac{(14,000)(A_{7.25})(1,000)}{(C)(t)(\epsilon)} \qquad \text{I}$$

14,000 = Molecular weight of 1,000 methylene groups;
$A_{7.25}$ = Absorbance at the 7.25 micron band;
$C$ = Concentration of polymer solution in gram/liter;
$t$ = Cell thickness in centimeters;
$\epsilon$ = Specific extinction coefficient.

The specific extinction coefficient ($\epsilon = 28,700$) was determined using three samples of an ethylene/propylene copolymer of known propylene content as a reference material. The value was obtained by solving the equation $$\epsilon = \frac{(14,000)(A_{7.25})}{(d)(t)(N)} \qquad \text{II}$$

$d$ = Density of polymer solution in gm./cc. (assumed to be 0.9);
$t$ = Thickness of absorbing layer of polymer in centimeters;
$N$ = Number of methyl branches in control polymer.

The percent propylene was calculated as follows:

$$\text{Percent} = \frac{(N)(100)}{333} \qquad \text{III}$$

In the Formula III, 333 is the number of methyl branches per 1,000 methylene groups.

The inherent viscosities referred to in the examples were determined by placing one tenth gram of polymer in a wire cage made from 80 mesh screen and placing the wire cage in 100 ml. of toluene contained in a wide-mouth 4-ounce bottle. After standing at room temperature (approximately 25° C.) for 24 hours, the cage was removed and the solution was filtered through a sulfur absorption tube of grade C porosity to remove any solid particles present. The resulting solution was run through a Media-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

The amount of toluene insolubles referred to in the examples is that amount of material not dissolved after 0.2 gram sample of the polymer remains in contact with 100 milliliters of toluene at room temperature for 24 hours. The value should be below 50 weight percent for a rubbery polymer. Ordinarily, it is preferred to have the value below 25 weight percent, but for some uses (mechanical goods, mats, shoe soles, etc.) it can be higher. For uses where high resilience and low heat build-up are important, it is desirable to have the toluene insolubles low.

Various modifications and alterations of this invention

We claim:

1. In a continuous process for solution polymerizing ethylene and at least one higher 1-monoolefin with a two-component soluble polymerization coordination catalyst comprising at least one compound of a reducible polyvalent transition metal of Groups IVB, VB, VIB, VIIB and VIII, and at least one reducing compound of a metal of Group I, II IIIA, IVA, and V, the improvement comprising separately and simultaneously charging to a polymerization reaction zone a first feed stream comprising said ethylene, solvent, and one of said catalyst components and the second feed stream comprising said higher 1-monoolefin, solvent, and the other of said catalyst components and withdrawing effluent therefrom at a rate sufficient to maintain a constant liquid volume in said reaction zone.

2. In a continuous process for solution polymerizing ethylene and at least one higher 1-monoolefin of the general formula $CH_2=CHR$, where R is an alkyl radical having 1 to 6 carbon atoms, with a two-component soluble polymerization coordination catalyst comprising at least one compound of a reducible polyvalent transition metal of Groups IVB, VB, VIB, VIIB and VIII, and at least one reducing compound of a metal of Group I, II, IIA, IVA and V, the improvement comprising separately and simultaneously charging to a polymerization reaction zone a first feed stream comprising said ethylene, solvent, and one of said catalyst components and the second feed stream comprising said higher 1-monoolefin, solvent, and the other of said catalyst components and withdrawing effluent therefrom at a rate sufficient to maintain a constant liquid volume in said reaction zone.

3. In a continuous process for solution polymerizing ethylene, at least one higher 1-monoolefin of the general formula $CH_2=CHR$, where R is an alkyl radical of 1 to 6 carbon atoms, and a termonomer which imparts unsaturation to the resulting polymer with a two-component soluble coordination catalyst comprising at least one compound of a reducible polyvalent transition metal of Groups IVB, VB, VIB, VIIB and VIII, and at least one reducing compound of a metal of Group I, II, IIIA, IVA, and V, the improvement comprising separately and substantially simultaneously charging to a polymerization reaction zone a first feed stream comprising said ethylene, solvent, and one of said catalyst components and a second feed stream comprising said higher 1-monoolefin solvent and the other of said catalyst components, said termonomer being charged to said polymerization zone in that said feed stream containing said reducing catalyst component and withdrawing effluent therefrom at a rate sufficient to maintain a constant liquid volume in said reaction zone.

4. The process according to claim 3 wherein said termonomer and said reducing catalyst component are present in said second feed stream.

5. The process according to claim 4, wherein said termonomer is dicyclopentadiene.

6. In a continuous process for solution polymerizing ethylene, propylene and dicyclopentadiene in toluene with a polymerization coordination catalyst comprising ethylaluminum sesquichloride and vanadium tetrachloride, the improvement comprising separately and substantially simultaneously charging to a polymerization reaction zone a first feed stream comprising said ethylene toluene, and vanadium tetrachloride and a second feed stream comprising said propylene, dicyclopentadiene, toluene and ethylaluminum sesquichloride and withdrawing effluent therefrom at a rate sufficient to maintain a constant liquid volume in said reaction zone.

7. In a continuous process for solution polymerizing ethylene, propylene and vinylacetylene in toluene with a polymerization coordination catalyst comprising ethylaluminum sesquichloride and vanadium tetrachloride, the improvement comprising separately and substantially simultaneously charging to a polymerization reaction zone a first feed stream comprising said ethylene, toluene, and vanadium tetrachloride and a second feed stream comprising said propylene, vinylacetylene, toluene and ethylaluminum sesquichloride and withdrawing effluent therefrom at a rate sufficient to maintain a constant liquid volume in said reaction zone.

References Cited

UNITED STATES PATENTS

| 3,291,784 | 12/1966 | Bebbington et al. | 260—94.9 |
| 3,166,538 | 1/1965 | Olson et al. | 260—88.2 |
| 3,211,709 | 10/1965 | Adamek et al. | 260—80.5 |

FOREIGN PATENTS

| 538,782 | 6/1955 | Belgium. |
| 856,736 | 12/1960 | Great Britain. |
| 857,183 | 12/1960 | Great Britain. |
| 857,938 | 1/1961 | Great Britain. |

JOSEPH L. SCHOFER, *Primary Examiner.*

M. B. KURTZMAN, W. HOOVER, *Assistant Examiners.*